United States Patent
Chen et al.

(10) Patent No.: US 7,957,954 B2
(45) Date of Patent: *Jun. 7, 2011

(54) SYSTEM AND COMPUTER PROGRAM PRODUCT FOR NATIONAL LANGUAGE SUPPORT USING A MULTI-LANGUAGE PROPERTY FILE

(75) Inventors: Yen-Fu Chen, Austin, TX (US); John W. Dunsmoir, Round Rock, TX (US); Rick A. Hamilton, II, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 362 days.

This patent is subject to a terminal disclaimer.

(21) Appl. No.: 12/174,874

(22) Filed: Jul. 17, 2008

(65) Prior Publication Data

US 2008/0275692 A1 Nov. 6, 2008

Related U.S. Application Data

(63) Continuation of application No. 10/933,633, filed on Sep. 2, 2004, now Pat. No. 7,440,888.

(51) Int. Cl.
*G06F 17/20* (2006.01)
*G06F 17/27* (2006.01)
*G06F 9/45* (2006.01)

(52) U.S. Cl. ................................. 704/8; 704/2; 717/136
(58) Field of Classification Search .......................... None
See application file for complete search history.

(56) References Cited

U.S. PATENT DOCUMENTS

| | | | |
|---|---|---|---|
| 5,963,155 A | 10/1999 | Cheng et al. | |
| 5,974,256 A | 10/1999 | Matthews et al. | |
| 6,400,287 B1 | 6/2002 | Ehrman | |
| 6,490,547 B1 | 12/2002 | Atkin et al. | |
| 7,152,222 B2 | 12/2006 | Kumhyr et al. | |
| 7,392,519 B2 * | 6/2008 | Nguyen et al. | 717/170 |
| 7,509,251 B2 * | 3/2009 | Andrews et al. | 704/8 |
| 2002/0165885 A1 | 11/2002 | Kumhyr et al. | |
| 2003/0004703 A1 | 1/2003 | Prabhakar et al. | |
| 2003/0023590 A1 | 1/2003 | Atkin | |
| 2003/0079051 A1 * | 4/2003 | Moses et al. | 709/328 |
| 2003/0110469 A1 | 6/2003 | Jackson | |
| 2003/0126559 A1 | 7/2003 | Fuhrmann | |
| 2003/0182103 A1 | 9/2003 | Atkin | |
| 2003/0187633 A1 | 10/2003 | Fairweather | |
| 2004/0122659 A1 * | 6/2004 | Hourihane et al. | 704/9 |

(Continued)

OTHER PUBLICATIONS

Core Java Technologies Tech Tips, May 6, 2003, pp. 1-9, http://java.sun.com/developer/Techtips/txtarchive/2003/May03_GlenM.txt.html.

(Continued)

*Primary Examiner* — Matthew J Sked
(74) *Attorney, Agent, or Firm* — Schmeiser, Olsen & Watts; John R. Pivnichny

(57) ABSTRACT

A system and computer program product for national language support. National language support for an application is provided by recording translations of a text string in corresponding different languages in a single property file so as to allow display of the translations in the property file. One of the translations of the text string recorded in the property file is selected for use by an application based on a locale associated with the execution of the application and the selected one of the translations is used in the execution of the application.

20 Claims, 6 Drawing Sheets

U.S. PATENT DOCUMENTS

2005/0044065 A1* 2/2005 McArdle .......................... 707/3
2005/0267733 A1 12/2005 Hueber et al.

OTHER PUBLICATIONS

Kuhn, Markus; "UTF-8 and Unicode FAQ for Unix/Linux," Jun. 4, 1999, pp. 1-33, http://www.cl.cam.ac.uk/~mgk25/unicode.html.

O'Conner, John; "Jave Internationalization: Localization with Resource Bundles," Oct. 1998, pp. 1-6, http://.java.sun.com/developer/technical/Articles/intl/ResourceBundles/.

Office Action (Mail Date Sep. 22, 2010) for U.S. Appl. No. 12/174,937, filed Jul. 17, 2008; Confirmation No. 9678.

Notice of Allowance (Mail Date Apr. 20, 2011) for U.S. Appl. No. 12/174,937, filed Jul. 17, 2008; Confirmation No. 9678.

* cited by examiner

SYSTEM AND COMPUTER PROGRAM PRODUCT FOR NATIONAL LANGUAGE SUPPORT USING A MULTI-LANGUAGE PROPERTY FILE

This application is a continuation application claiming priority to Ser. No. 10/933,633, filed Sep. 2, 2004.

FIELD OF THE INVENTION

The invention relates to data processing in general and, more particularly, to national language support of programs.

BACKGROUND OF THE INVENTION

One issue in the development of applications for international distribution is the ability to support different languages. Such support is often referred to as National Language Support or NLS. One technique that may reduce development time for applications is to provide a language independent program or template that is then combined with language specific information to provide the application in a specific language. Such a technique may reduce overall development time but may provide its own problems.

JAVA® (JAVA® is a trademark of SUN Microsystems) programs conventionally handle multi-language labels and graphics in web pages by maintaining property files in the "name-value" format. Each label is given a name using ASCII (readable text), and then is associated with the appropriate translation based on a given property file. This technique permits one set of programs to be written in a language independent or neutral format. The specific "Locale" (NLS specifier) is then used to select the correct property file via modifiers such as ResourceBundles.

As discussed above, one technique used to provide NLS in JAVA® applications is the ResourceBundle. ResourceBundles appeared in web technology in approximately 1999 in JAVA® version 1.1. At that time, NLS was not fully understood by developers, and as such, this implementation lacked very basic functionality. In particular, it should not be possible to specify an "encoding" for the data in a ResourceBundle. The rules of the JAVA® standard dictate that this must be the default ISO-8859-1 encoding (which actually means that the data is treated as 8-bit bytes without any encoding at all). This technique is functional for single byte Western European languages, but it may have drawbacks when applied to double byte languages, or even some single byte languages such as Arabic, Hebrew, and Tamil, among others.

In order to overcome this limitation, the JAVA® recommendation, (via SUN), for these languages is to use the Unicode hexadecimal standard, where every Unicode character is represented by six bytes of the form "\uxxxx". This data is then translated using the JAVA® pre-compiler code where it is converted into 16 bit Unicode.

A potential drawback related to this method may result from the conversion of the translated text into an unreadable format. This conversion process would normally need to be accomplished in a development lab as part of the build process of an application, because those not specifically skilled in the art may find it difficult to decipher the coding. This technique, as such, is very inflexible and may require significant time and expense, not to mention development delays, if any changes are required in any of these translated labels.

ResourceBundles, however, are property files, which allow them to be "discovered" through the CLASSPATH variable definition and are very easily read and rendered into the appropriate form. Additionally, ResourceBundles have excellent techniques for selecting default files, where the specified NLS property file does not exist, or cannot be found. In particular, the ResourceBundles may use a hierarchical selection process based on file name of the property files.

Extensible Markup Language (XML) has been used as an alternative to ResourceBundles. XML may have one major advantage over ResourceBundles in that "encoding" can be specified for each XML file, usually as "UTF-8". This is reasonable and feasible as long as the editor in use understands that "UTF-8" (for example, UnicEdit) data can be seen in the natural font and can be edited in the appropriate language, and then saved as "UTF-8" formatted data. This technique can overcome the problems associated with ResourceBundles, where the data, typically, must be rendered into an unreadable "\uxxxx" format.

XML may, however, have disadvantages in comparison to ResourceBundles in that the format may be difficult for translators to work with. ResourceBundles have a very easy, intuitive, format. XML also may require a significantly greater amount of JAVA® code to read, parse, and handle errors when compared to ResourceBundles. There also is, typically, no "Locale" and "default" implementation for selecting the correct property file. Also, there is, typically, no automatic way to find an XML file through the CLASSPATH variable setting.

SUMMARY OF THE INVENTION

Certain embodiments of the present invention provide methods, systems and computer program products for providing national language support for an application, by recording translations of a text string in corresponding different languages in a single property file so as to allow display of the translations in the property file. One of the translations of the text string recorded in the property file is selected for use by an application based on a locale associated with the execution of the application and the selected one of the translations is used in the execution of the application.

In further embodiments of the present invention, the translations are recorded as UTF-8 bytestreams. Furthermore, the application program may be a JAVA® program. Some embodiments of the present invention further include converting the selected one of the translations recorded as a UTF-8 bytestream to an ISO 8859-1 encoded string for use in the execution of the application. In additional embodiments of the present invention, the property file is edited with the translations displayed in the native language.

In still further embodiments of the present invention, a key value is associated with each translation. The key values reflect a locale associated with the language of the translation. Selecting one of the translations may be provided by selecting one of the translations having a key value that corresponds to the locale associated with the execution of the application. Selecting one of the translations could be provided by determining locales associated with translations in different languages based on the characters used in the translation and selecting the translation based on the determined locale of the translation.

In additional embodiments of the present invention, translations in a plurality of property files are converted into a single multi-language property file to provide the property file. The translations in the property files may be associated with a corresponding key and the file names of the property files may include locale information. In such a case, converting the translations may include appending the locale information from the file names onto key values in the corresponding property file to provide updated key values and appending the translations and updated key values into the single multi-language property file. Alternatively, where the translations in the property files are associated with a corresponding key converting translations may include appending the key and translations in the plurality of property files into the single multi-language property file.

DETAILED DESCRIPTION OF EMBODIMENTS OF THE INVENTION

Figure 1:
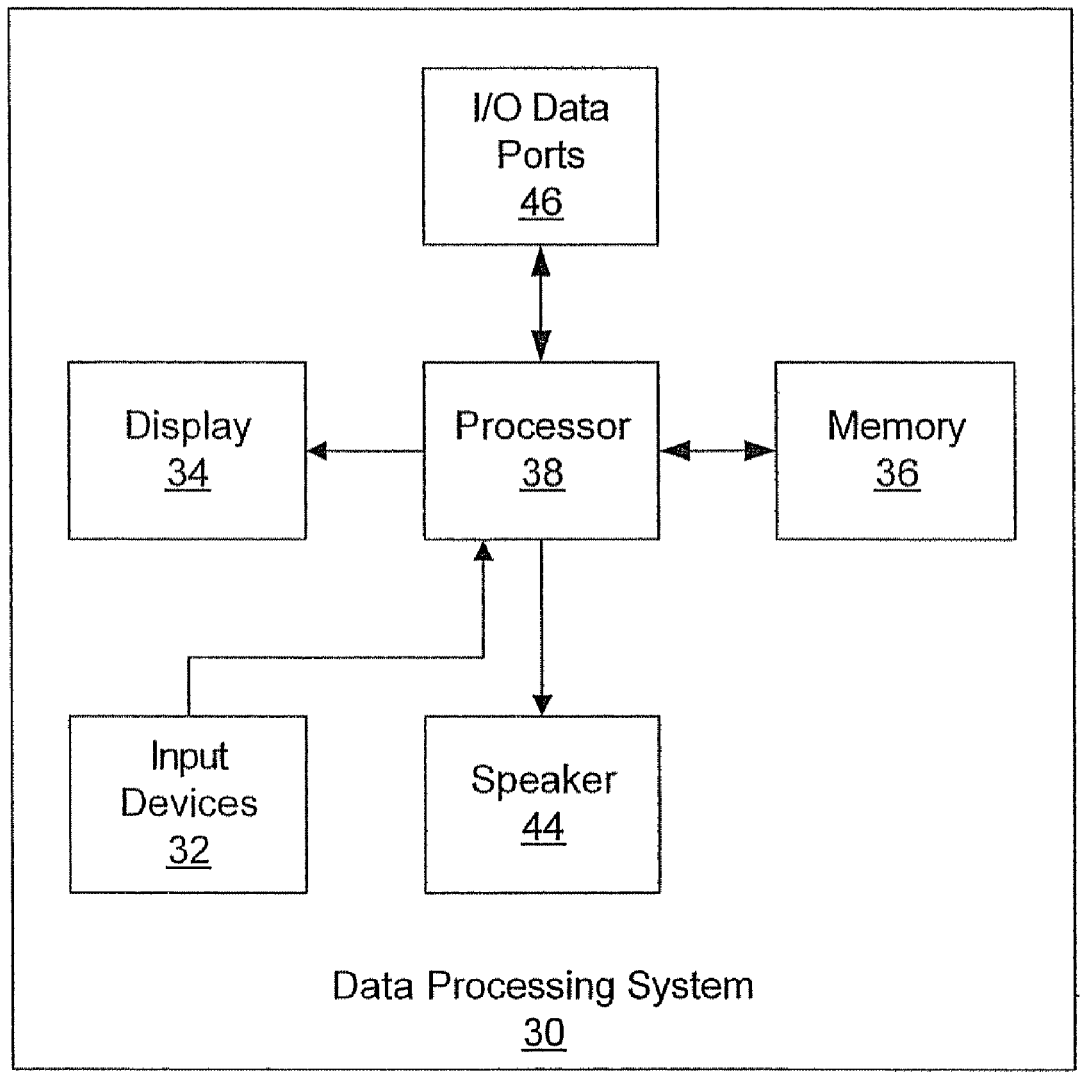
FIG. 1 is a block diagram of a data processing system suitable for use according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as JAVA®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to flowchart illustrations and/or block diagrams of methods, systems and/or computer program products according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with respect to FIGS. 1 through 6. As described herein, some embodiments of the present invention provide national language support by providing a property file that includes translations of text in different languages and that may be displayed for editing in the natural font of the various languages. In particular embodiments of the present invention, the translations are recorded in the property file as UTF-8 bytestreams. The property file may be parsed based on a locale of the data processing system executing the application using the property file and the particular translation selected based on the locale. The translations may be converted upon extraction from the property file to the particular format required by the application. By providing the translations in a format that may be displayed in the natural font of the translation language, the property files may be edited without specific knowledge of the coding format in which the translations are stored and/or utilized.

Referring now to FIG. 1, a block diagram of data processing systems suitable for use in systems according to some embodiments of the present invention will be discussed. As illustrated in FIG. 1, an exemplary embodiment of a data processing system 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 2:
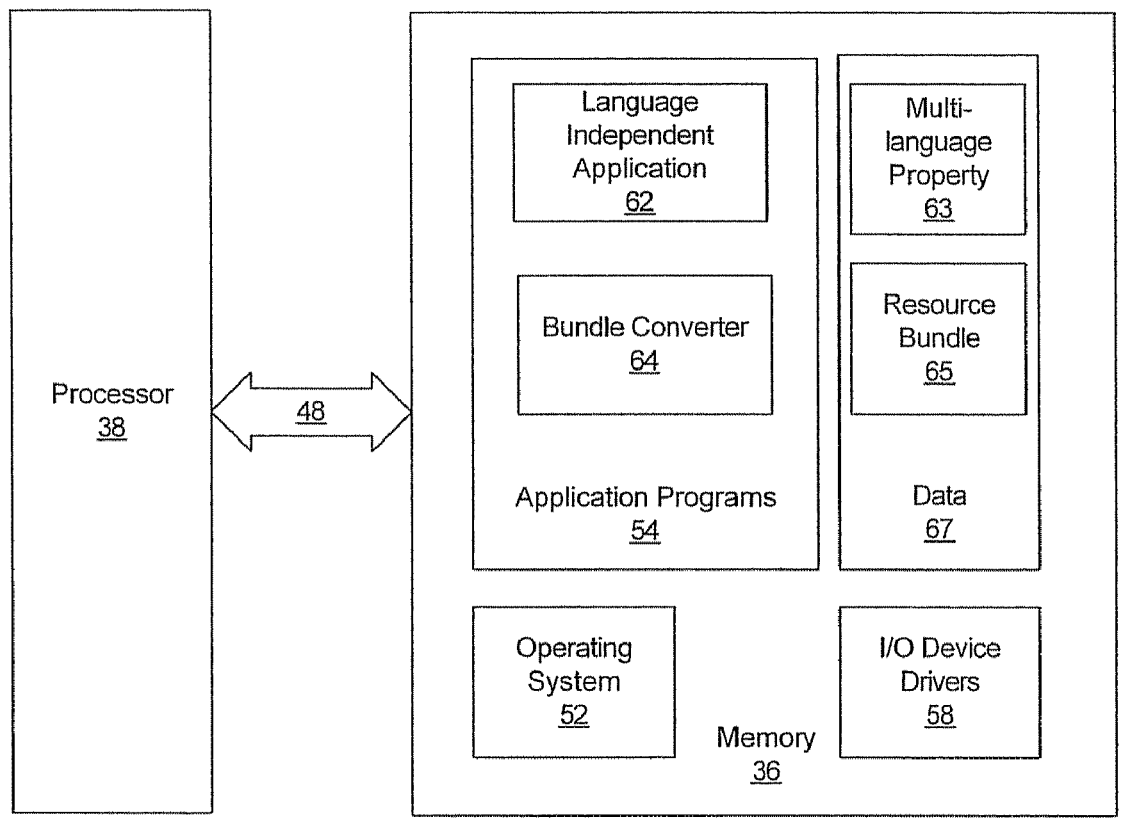
FIG. 2 is a more detailed block diagram of a system for providing national language support according to some embodiments of the present invention.

FIG. 2 is a block diagram of data processing systems that illustrate systems, methods, and/or computer program products in accordance with embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

As shown in FIG. 2, the memory 36 may include several categories of software and data used in the data processing system 30: the operating system 52; the application programs 54; the input/output (I/O) device drivers 58; and the data 67. As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30. Finally, the data 67 represents the static and dynamic data used by the application programs 54, the operating system 52, the I/O device drivers 58, and other software programs that may reside in the memory 36.

As is further seen in FIG. 2, the application programs 54 may include at least one language independent application 62. As used herein, the term language independent application refers to any application that may provide a language neutral representation and controls an executable sequence of operations of a data processing system, either alone or in conjunction with other programs, and that is combined with language specific data to provide a language specific instance of the application. Such applications may include, for example, web pages, servlets, applets or the like. In particular embodiments of the present invention, the language independent application is a JAVA® application. The language independent application 62 uses the multi-language property file to utilize different translations of text based on a locale associated with the execution of the language independent application 62. Thus, for example, the operating system 52 may provide locale information that is accessible by the language independent application 62. Techniques for determining a locale associated with an executing instance of an application program are well known to those of skill in the art and, therefore, will not be described in further detail herein. Optionally a bundle converter application 64 may also be provided. The bundle converter application 64 may convert multiple property files with different language translations into a single multi-language property file as described in further detail herein.

The data portion 67 of memory 36, as shown in the embodiments illustrated in FIG. 2, may include multi-language property data 63, for example, by loading a multi-language property file into memory. Data from a resource bundle 65 that includes multiple property files may also be loaded into memory for use by the bundle converter application 64.

While embodiments of the present invention have been illustrated in FIG. 2 with reference to a particular division between application programs, data and the like, the present invention should not be construed as limited to the configuration of FIG. 2 but is intended to encompass any configuration capable of carrying out the operations described herein.

Figure 3:
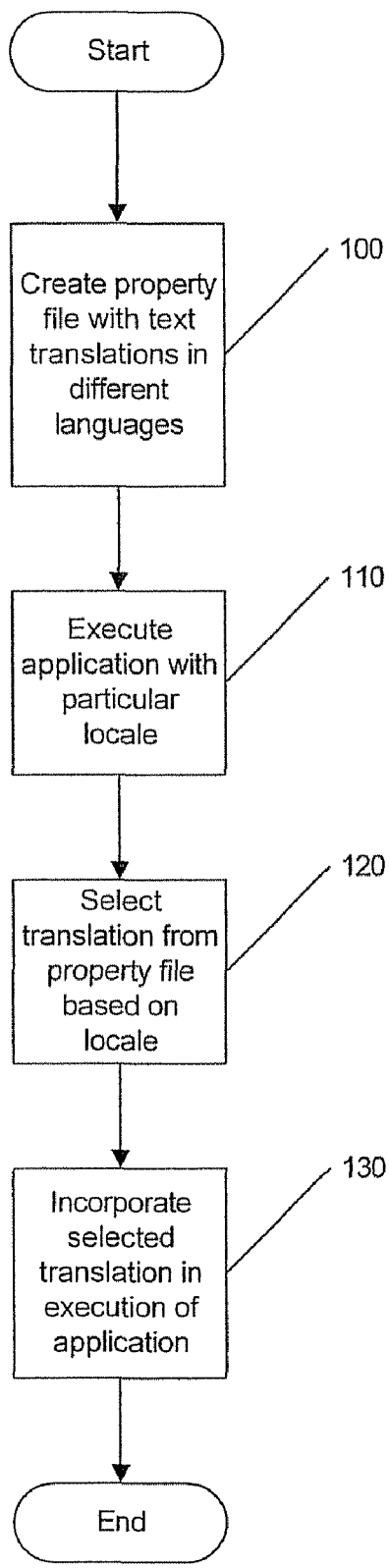
FIG. 3 is a is a flowchart illustrating operations for providing national language support according to some embodiments of the present invention.

FIG. 3 illustrates operations for providing native language support utilizing a multi-language property file according to some embodiments of the present invention. As seen in FIG. 3, a property file is created with text translations in different languages (block 100). In certain embodiments of the present invention, the text translations are recorded in the property file as bytestreams of a universal character set that is displayable in a natural font of the language represented by the translated text, such as UTF-8 bytestreams. By recording the translations in the property file in a character set that is displayable in the natural font of the language represented by the translated text, the property file may be updated based on the display of the translations in their natural font. Thus, specific knowledge of the digital representations of the characters need not be known to update the translations as they are displayed in the natural font of the language of the translations. In particular embodiments of the present invention, the multi-language property file is a property file of a ResourceBundle.

In certain embodiments of the present invention, the translations for a key are recorded as UTF-8 byte streams within a property file of a ResourceBundle, rather than in the "\uxxxx" format. Doing so may preserve the advantages of ResourceBundles over XML as described above. Furthermore, the property file may be easily handled, for example, by translation centers, in their respective native languages. The translation center can add the native language to the property file, and then save the file as a UTF-8 file. The translation center can then edit and change this file at any time, and there may be no "build" process required to reformat and incorporate the files. Furthermore, the property file may be uncluttered by XML statements and, therefore, may be easier to use and maintain.

As is further illustrated in FIG. 3, a language independent application, such as the language independent application 62, is executed on a data processing system with a particular locale associated with the execution of the application (block 110). The data from the property file is loaded, for example, to provide the multi-language property data 63, and a translation from the translations of different languages appropriate to the locale is automatically selected from the multi-language property data (block 120). The selected translation is automatically incorporated into the execution of the application to provide a locale specific executing instance of the application (block 130).

In some embodiments of the present invention, when the translation text is read from memory it may need to be translated from the character set in which it is stored in the property file to the format that is used by the application. For example, if the translation text is recorded in the property file as UTF-8 and the application is a JAVA® application, the translation text may need to be translated from UTF-8 to the 16 bit Unicode format. Such a translation may, for example, be accomplished by incorporating a translation statement into the application when the multi-language property data is accessed.

When the property file is a property file of a ResourceBundle, ResourceBundle data values are held as bytes without encoding. When these values are read into memory, JAVA® will place them into Strings, in which each byte occupies the lower 8 bits of a 16 bit Unicode character. If, however, the byte stream is UTF-8 format, then for any character beyond the 7 bit ASCII range, it will take two or three 16 bit Unicode characters in memory to represent each UTF-8 character. To change the encoding of such a String into the correct format, the String may be converted using the following statement:

String newString=new String(oldString.getBytes ("ISO8859_1"), "UTF8");

If it is possible that the string may contain any data other than 7 bit ASCII, whenever a String is retrieved from a ResourceBundle, this statement may be executed in order to convert the String. In some embodiments of the present invention, a test could be performed to determine if the String contains data other than 7 bit ASCII before executing the conversion statement to change the encoding of the String.

In some embodiments of the present invention, the translations may be stored in the property file in the key=value format. In such a case, the key values may correspond to labels in the language independent application and the value may be used to replace the label when the application is executed. The techniques used to select a specific string of translation text for use by the application may depend on the format of the key=value information in the property file. For example, in some embodiments, the key may be augmented by a label corresponding to the locale associated with the translation text. Such an augmentation may take the form of a label similar to that utilized to distinguish between NLS property files of a ResourceBundle. Thus, for example, entries in the property file may take the form of key_locale. For example, a key for a United States, English locale select button may be "select_us_en" whereas a key for the same select button in Canadian French may be "select_fr_ca." Thus, the keys in the property file may be augmented to reflect the locale associated with the translations.

Figure 4:
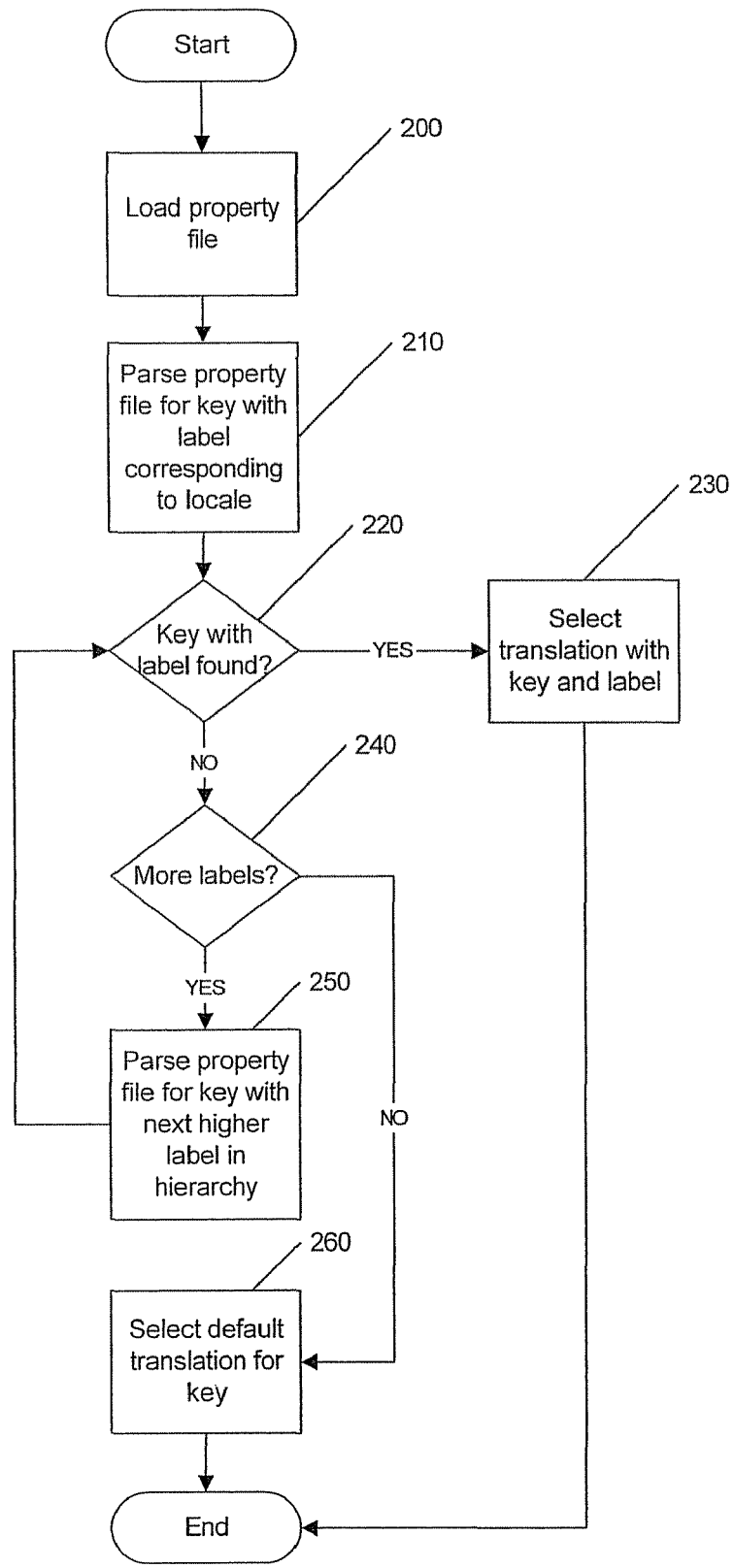
FIG. 4 is a is a flowchart illustrating operations for providing national language support according to further embodiments of the present invention.

FIG. 4 illustrates operations for selecting a translation value where the key values include labels that indicate the locale associated with the translation associated with the key as described above. As illustrated in FIG. 4, the multi-language property file is loaded into memory (block 200) and parsed for a key value pair with the desired key and a label corresponding to the locale of the executing program (block 210). If an entry with the desired key and label are found (block 220), the corresponding value is selected as the translation for use by the application (block 230). If an entry with the desired key and label are not found (block 220), it is determined if additional keys with labels exist in the property file (block 240). For example, different versions of the same key may have different locale labels associated with them in a hierarchical manner. Thus, if the label "en_us" is not present, the property file may contain a version of the key with only the label "en" or a version of the key with no label. If such additional keys with labels are present (block 240), the property file is parsed to determine if a key with a next higher label in the hierarchy is present (block 250). If such a key is found (block 220), the corresponding value is selected as the translation for use by the application (block 230). If such a key is not found (block 220), the operations of blocks 240 and 250 are repeated until there are no more candidate keys with labels for evaluation or until a key with a label in the hierarchy is located. If no such key is located and there are no more candidate keys with labels (block 240), a default translation for the key may be selected for use by the application (block 260). The default translation may be a key with no label.

In the example provided above, the select key may have four entries in the property file. The entries may include a "select" entry, a "select_en" entry, a "select_en_us" entry and a "select_en_uk" entry. If the locale of the user is the United States and the language is English, the value corresponding to the "select_en_us" entry will be selected. However, if the locale is Sweden and the language is English, the property file would be parsed for an entry "select_en_se." Upon failing to locate such an entry, the property file would be parsed for the next higher entry in the hierarchy which would be "select_en." Since this entry exists, the value for "select_en" would be selected. Finally, if the locale indicates Israel and the language is Hebrew, the property file would the parsed for a "select" key with the label for Hebrew and Israel and then for Hebrew and fail to locate such entries. Thus, the value corresponding to the "select" entry with no label would be utilized as the default.

By incorporating the labels indicating the locale information into the keys of the property file, the information conventionally provided by the file names of different property files in a ResourceBundle may be incorporated into a single file. Furthermore, by using UTF-8 as the character set for recording the key value pairs in the property file, the property file may be readily displayed and/or edited with the translations appearing in their natural font.

Figure 5:
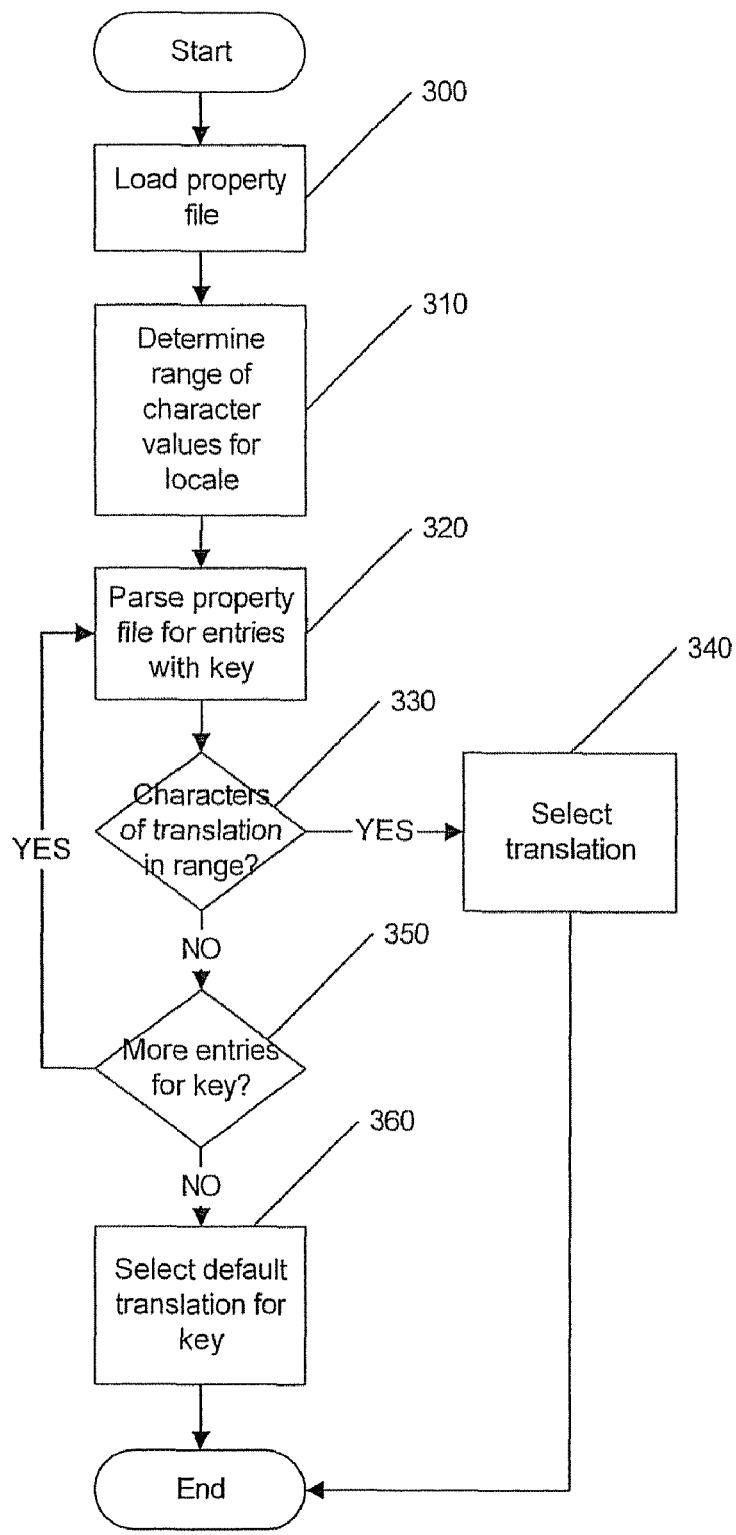
FIG. 5 is a is a flowchart illustrating operations for providing national language support according to further embodiments of the present invention.

In further embodiments of the present invention, the property file provides the different translations for text associated with a key utilizing the same key without a label. Thus, for example, the different translations for the text to be used with the "select" key will all be recorded as "select=translation." In such a case, the characters used in the translation portion of the key value pair may be evaluated to determine the language and the particular pair selected based on such a determination. FIG. 5 is a flowchart illustrating operations for such a format of the property file according to some embodiments of the present invention.

As illustrated in FIG. 5, the multi-language property file is loaded into memory (block 300) and a range or list of character values associated with the locale of the executing application is determined (block 310). In particular embodiments of the present invention, the range or list of characters is the range or list of characters in UTF-8 encoding that are utilized by the language associated with the locale. Thus, for example, the range of encoded values of Chinese characters in UTF-8 may be determined if the locale of the executing application indicates that the language to be used is Chinese.

The data from the loaded property file is parsed to locate entries that have a desired key value (block 320) and the value of the translation is evaluated to determine if the characters in the translation correspond to the range or list associated with the locale (block 330). If the characters do correspond (block 330), the translation is selected for use by the application (block 340). Optionally, the selected translation may be cached into memory for subsequent use so that the parsing of the loaded property file may be avoided if the translation is subsequently used by the application. Such a caching of the results of the parsing may improve performance. The cached translation data may, optionally, be stored in a portable format, such as a name-value pair or XML, so that an administrator of the multi-language property file and/or application can configure the data for reuse.

If the characters do not correspond to the range or list associated with the locale (block 330), it is determined if there are more entries for the desired key value (block 330). If so, then operations continue at block 320. If not, then a default translation is selected for use by the application (block 360). For example, if after evaluating all translations for a key value none match the desired language, the English translation could be used as the default.

Figure 6:
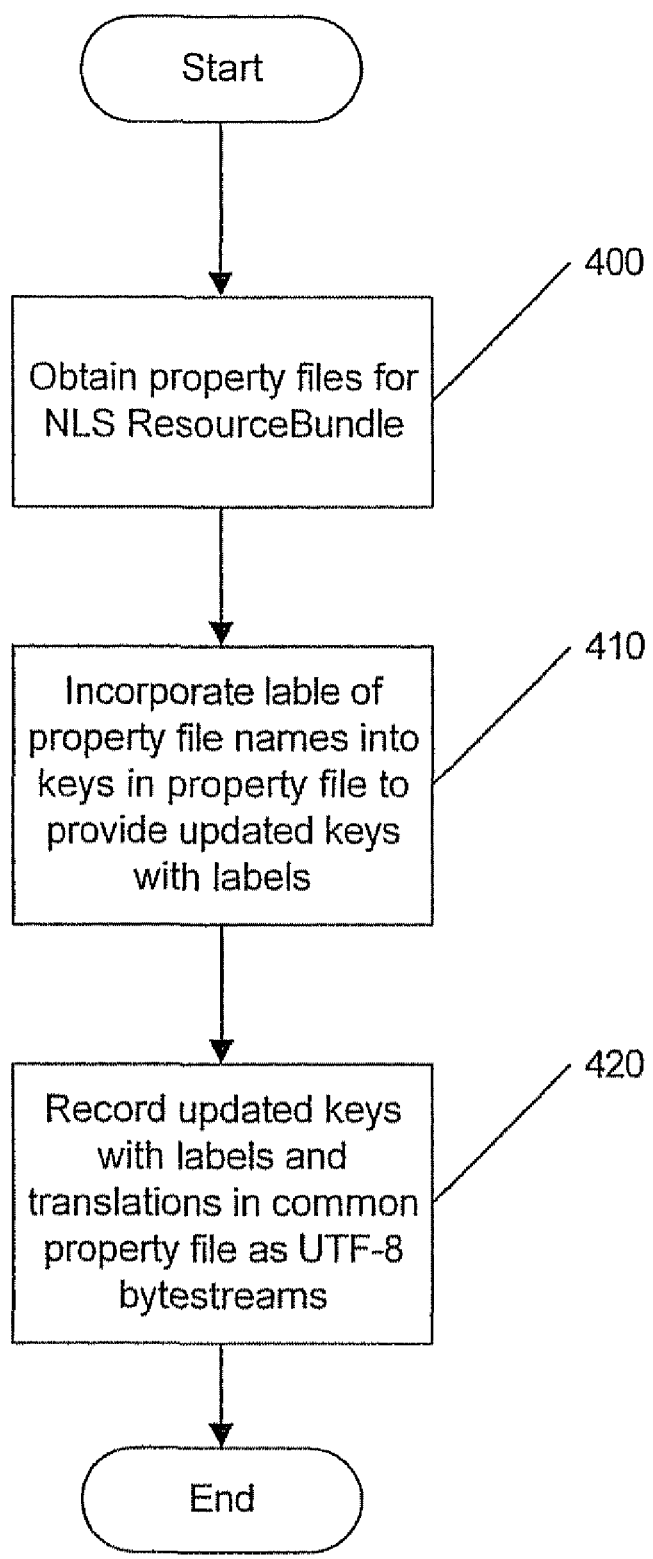
FIG. 6 is a is a flowchart illustrating operations for providing national language support according to further embodiments of the present invention.

FIG. 6 is a flowchart illustrating operations for conversion of an existing ResourceBundle having a plurality of property files to a single multi-language property file according to some embodiments of the present invention. Such operations may, for example, be carried out by the bundle converter application 64. As seen in FIG. 6, the property files for a NLS ResourceBundle are obtained (block 400) and the locale label portion of the file names are incorporated into the keys in the property files to provide updated key values (block 410). For example, if the file name of a property file is "buttons_en_us.property" then the key values in the property file would have the "en_us" portion of the file name appended to them. If a key value in the property file is "select," then the updated key value would be "select_en_us." The updated key values and translations are recorded in a single property file as UTF-8 bytestreams (block 420). The translations may then be accessed as described above with reference to FIGS. 3 and 4.

Alternatively, if the format of translations discussed with reference to FIG. 5 is utilized, the multiple property files of a ResourceBundle may be combined into a single multi-language property file by appending the contents of each property file into a single file and saving the file in UTF-8 format. In either case, the single multi-language property file may be managed and updated in the natural font of the languages of the translations as described above. Thus, in some embodiments of the present invention, existing ResourceBundles may be utilized to develop the single multi-language property file.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A computer program product, comprising a computer readable storage device having a computer readable program code stored therein, said computer readable program code containing instructions configured to be executed by a processor of a data processing system to implement a method for providing national language support for an application, said method comprising:

generating a multi-language property file by processing each individual property file of a plurality of individual property files, wherein each individual property file comprises a file name comprising a label appended to a class and further comprises file content comprising a key value and a translated text pertaining to the label, wherein the key value is a member of the class, wherein said processing each individual property file comprises generating a translation and recording the generated translation in the multi-language property file, wherein the generated translation comprises the translated text and a key comprising the label appended to the key value, wherein the label is null, consists of a language identifier, or consists of the language identifier and a locale identifier, and wherein the translated text of each said translation is formatted in a character set that is displayable in a natural font of a language represented by the translated text;

ascertaining, from an operating system of the data processing system, a language identifier and a locale identifier, wherein execution of a language independent application is configured to be performed in a locale identified by the ascertained locale identifier and to display text in accordance with a first key value and in a language identified by the ascertained language identifier;

executing the application in the locale identified by the ascertained locale identifier;

during said executing the application, selecting from the multi-language property file a translation whose label comprises a key value that matches the first key value and whose label further comprises the ascertained language identifier and the ascertained locale identifier of the executing application or whose label comprises the ascertained language identifier but not the ascertained locale identifier of the executing application or whose label is null;

during said executing the application, displaying the translated text of the selected translation in the language identified by the ascertained language identifier.

2. The computer program product of claim 1, wherein the label of the selected translation comprises the ascertained language identifier and the ascertained locale identifier.

3. The computer program product of claim 2, wherein the class pertaining to the selected translation is buttons, wherein the key value is select and pertains to a select button that is a member of the class of buttons, wherein the language identified by the ascertained language identifier is English, and wherein the locale identified by the ascertained locale identifier is the United States.

4. The computer program product of claim 1, wherein the method determines that no translation in the multi-language property file includes a label that comprises the ascertained language identifier and the ascertained locale identifier, and wherein the label of the selected translation comprises the ascertained language identifier but not the ascertained locale identifier.

5. The computer program product of claim 4, wherein the class pertaining to the selected translation is buttons, wherein the key value is select and pertains to a select button that is a member of the class of buttons, wherein the language identified by the ascertained language identifier is English, and wherein the locale identified by the ascertained locale identifier is Sweden.

6. The computer program product of claim 1, wherein the method determines that no translation in the multi-language property file includes a label that comprises the ascertained language identifier or the ascertained locale, and wherein the label of the selected translation is null.

7. The computer program product of claim 6, wherein the class pertaining to the selected translation is buttons, wherein the key value is select and pertains to a select button that is a member of the class of buttons, wherein the language identified by the ascertained language identifier is Hebrew, and wherein the locale identified by the ascertained locale identifier is the Israel.

8. The computer program product of claim 1, wherein said recording comprises recording the generated translation in the multi-language property file as a UTF-8 bytestream, and wherein the method further comprises converting the translated text of the selected translation from the UTF-8 bytestream to an ISO 8859-1 encoded string for use during said executing the application.

9. A data processing system comprising a processor and a computer readable memory unit coupled to the processor, said memory unit containing program code configured to be executed by the processor to implement a method for providing national language support for an application, said method comprising:

generating a multi-language property file by processing each individual property file of a plurality of individual property files, wherein each individual property file comprises a file name comprising a label appended to a class and further comprises file content comprising a key value and a translated text pertaining to the label, wherein the key value is a member of the class, wherein said processing each individual property file comprises generating a translation and recording the generated translation in the multi-language property file, wherein the generated translation comprises the translated text and a key comprising the label appended to the key value, wherein the label is null, consists of a language identifier, or consists of the language identifier and a locale identifier, and wherein the translated text of each said translation is formatted in a character set that is displayable in a natural font of a language represented by the translated text;

ascertaining, from an operating system of the data processing system, a language identifier and a locale identifier, wherein execution of a language independent application is configured to be performed in a locale identified by the ascertained locale identifier and to display text in accordance with a first key value and in a language identified by the ascertained language identifier;

executing the application in the locale identified by the ascertained locale identifier;

during said executing the application, selecting from the multi-language property file a translation whose label comprises a key value that matches the first key value and whose label further comprises the ascertained language identifier and the ascertained locale identifier of the executing application or whose label comprises the ascertained language identifier but not the ascertained locale identifier of the executing application or whose label is null;

during said executing the application, displaying the translated text of the selected translation in the language identified by the ascertained language identifier.

10. The data processing system of claim 9, wherein the label of the selected translation comprises the ascertained language identifier and the ascertained locale identifier.

11. The data processing system of claim 10, wherein the class pertaining to the selected translation is buttons, wherein the key value is select and pertains to a select button that is a member of the class of buttons, wherein the language identified by the ascertained language identifier is English, and wherein the locale identified by the ascertained locale identifier is the United States.

12. The data processing system of claim 9, wherein the method determines that no translation in the multi-language property file includes a label that comprises the ascertained language identifier and the ascertained locale identifier, and wherein the label of the selected translation comprises the ascertained language identifier but not the ascertained locale identifier.

13. The data processing system of claim 12, wherein the class pertaining to the selected translation is buttons, wherein the key value is select and pertains to a select button that is a member of the class of buttons, wherein the language identified by the ascertained language identifier is English, and wherein the locale identified by the ascertained locale identifier is Sweden.

14. The data processing system of claim 9, wherein the method determines that no translation in the multi-language property file includes a label that comprises the ascertained language identifier or the ascertained locale, and wherein the label of the selected translation is null.

15. The data processing system of claim 14, wherein the class pertaining to the selected translation is buttons, wherein the key value is select and pertains to a select button that is a member of the class of buttons, wherein the language identified by the ascertained language identifier is Hebrew, and wherein the locale identified by the ascertained locale identifier is the Israel.

16. The data processing system of claim 9, wherein said recording comprises recording the generated translation in the multi-language property file as a UTF-8 bytestream, and wherein the method further comprises converting the translated text of the selected translation from the UTF-8 bytestream to an ISO 8859-1 encoded string for use during said executing the application.

17. A computer program product, comprising a computer readable storage device having a computer readable program code stored therein, said computer readable program code containing instructions configured to be executed by a processor of a data processing system to implement a method for providing national language support for an application, said method comprising:

generating a multi-language property file by processing each individual property file of a plurality of individual property files, wherein each individual property file comprises a file name and further comprises file content comprising a key value and a translated text, wherein the key value is a member of a class, wherein said processing each individual property file comprises generating a translation and recording the generated translation in the multi-language property file, wherein the generated translation comprises the translated text and a key comprising a keyword appended to the key value, and wherein the translated text of each said translation is formatted in a character set that is displayable in a natural font of a language represented by the translated text;

ascertaining, from an operating system of the data processing system, a locale identifier and a list of characters of a language associated with a locale identified by the ascertained locale identifier, wherein execution of a language independent application is configured to be performed in the locale and to display text in accordance with a first key value and in the language associated with the locale;

executing the application in the locale;

during said executing the application, selecting from the multi-language property file a translation whose label comprises a key value that matches the first key value and subsequently determining in response to the keyword in the selected translation that the characters in the translated text in the selected translation are within the ascertained list of characters of the language associated with the locale;

during said executing the application, displaying the translated text of the selected translation in the language associated with the locale.

18. The computer program product of claim 17, wherein said recording comprises recording the generated translation in the multi-language property file as a UTF-8 bytestream, and wherein the method further comprises converting the translated text of the selected translation from the UTF-8 bytestream to an ISO 8859-1 encoded string for use during said executing the application.

19. A data processing system comprising a processor and a computer readable memory unit coupled to the processor, said memory unit containing program code configured to be executed by the processor to implement a method for providing national language support for an application, said method comprising:

generating a multi-language property file by processing each individual property file of a plurality of individual property files, wherein each individual property file comprises a file name and further comprises file content comprising a key value and a translated text, wherein the key value is a member of a class, wherein said processing each individual property file comprises generating a translation and recording the generated translation in the multi-language property file, wherein the generated translation comprises the translated text and a key comprising a keyword appended to the key value, and wherein the translated text of each said translation is formatted in a character set that is displayable in a natural font of a language represented by the translated text;

ascertaining, from an operating system of the data processing system, a locale identifier and a list of characters of a language associated with a locale identified by the ascertained locale identifier, wherein execution of a language independent application is configured to be performed in the locale and to display text in accordance with a first key value and in the language associated with the locale;

executing the application in the locale;

during said executing the application, selecting from the multi-language property file a translation whose label comprises a key value that matches the first key value and subsequently determining in response to the keyword in the selected translation that the characters in the translated text in the selected translation are within the ascertained list of characters of the language associated with the locale;

during said executing the application, displaying the translated text of the selected translation in the language associated with the locale.

20. The computer program product of claim 19, wherein said recording comprises recording the generated translation in the multi-language property file as a UTF-8 bytestream, and wherein the method further comprises converting the translated text of the selected translation from the UTF-8 bytestream to an ISO 8859-1 encoded string for use during said executing the application.

* * * * *